United States Patent [19]

Gwinn

[11] Patent Number: 5,782,461
[45] Date of Patent: Jul. 21, 1998

[54] SNUBBER USING BULK LOADING

[75] Inventor: James T. Gwinn, Erie, Pa.

[73] Assignee: Lord Corporation, Cary, N.C.

[21] Appl. No.: 770,143

[22] Filed: Dec. 19, 1996

[51] Int. Cl.[6] .............................. F16M 7/00; B60G 11/22
[52] U.S. Cl. ................................ 267/140; 267/292
[58] Field of Search ...................... 267/3, 6, 136, 267/139, 140, 140.13, 141.1–141.7, 201, 292–294; 248/560, 562, 566, 634–638; 105/224.05, 224.1, 3; 180/300.312; 293/132, 136, 138; 114/219

[56] References Cited

U.S. PATENT DOCUMENTS

| | | | |
|---|---|---|---|
| 1,791,261 | 2/1931 | Ballman | 267/141.3 |
| 2,079,798 | 5/1937 | Geyer | 267/141.4 |
| 2,306,392 | 12/1942 | Light . | |
| 2,620,180 | 12/1952 | Dath . | |
| 2,621,876 | 12/1952 | Else | 267/141.4 |
| 3,202,412 | 8/1965 | Trask . | |
| 3,239,185 | 3/1966 | Sweeney et al. | 248/562 |
| 3,437,332 | 4/1969 | Lee . | |
| 3,539,173 | 11/1970 | Sampson . | |
| 3,677,535 | 7/1972 | Beck | 267/294 |
| 3,721,433 | 3/1973 | Sobel . | |
| 3,739,882 | 6/1973 | Schwenk et al. . | |
| 3,784,182 | 1/1974 | Sobel | 267/140 |
| 3,814,412 | 6/1974 | Brittan et al. | 267/292 |
| 3,865,417 | 2/1975 | Zwicki . | |
| 3,926,231 | 12/1975 | Harrison et al. | 267/3 |
| 3,957,127 | 5/1976 | Bouchard et al. | 267/141.3 |
| 4,002,244 | 1/1977 | Matsumoto et al. . | |
| 4,085,832 | 4/1978 | Gaines et al. . | |
| 4,235,576 | 11/1980 | Robinson . | |
| 4,357,032 | 11/1982 | Kenyon | 267/292 |
| 4,368,672 | 1/1983 | Germer | 267/3 |
| 4,418,898 | 12/1983 | Atsumi et al. | 267/141.1 |
| 4,428,568 | 1/1984 | McNatt et al. . | |
| 4,441,644 | 4/1984 | Farian . | |
| 4,567,833 | 2/1986 | Hausau | 267/3 |
| 4,571,215 | 2/1986 | Hansen . | |
| 4,591,030 | 5/1986 | Antkowiak . | |
| 4,738,436 | 4/1988 | Loggers | 267/294 |
| 4,997,171 | 3/1991 | Toms, Jr. . | |
| 5,085,382 | 2/1992 | Finkenbeiner . | |
| 5,248,134 | 9/1993 | Ferguson et al. . | |
| 5,295,671 | 3/1994 | Nakagaki et al. | 248/638 |
| 5,456,454 | 10/1995 | Schulz et al. . | |
| 5,482,260 | 1/1996 | Schmidt . | |

FOREIGN PATENT DOCUMENTS

94/10695  1/1994  WIPO .................. 267/141.1

*Primary Examiner*—Robert J. Oberleitner
*Assistant Examiner*—Chris Schwartz
*Attorney, Agent, or Firm*—Randall S. Wayland; James W. Wright; Richard K. Thomson

[57] ABSTRACT

An elastomeric bumper restricts movement of large objects such as diesel engines to ±0.5" along the bumper's axis. The bumper includes a solid elastomeric button, an elastomeric sleeve spaced therefrom by a gap, and a rigid, tight fitting cup which surrounds the sleeve and limits the outward bulging of the elastomer. The button has an axial length which exceeds the length of the sleeve by an amount which defines a first volume of elastomer. That volume is designed to be equal to the volume of the gap. When the movement of the large object has caused the equivalent of the first volume of elastomer to flow into the gap, additional movement of the object is resisted by bulk loading of the elastomer which behaves as an incompressible fluid and resists additional motion with the full weight of the support to which the bumper is attached.

9 Claims, 5 Drawing Sheets

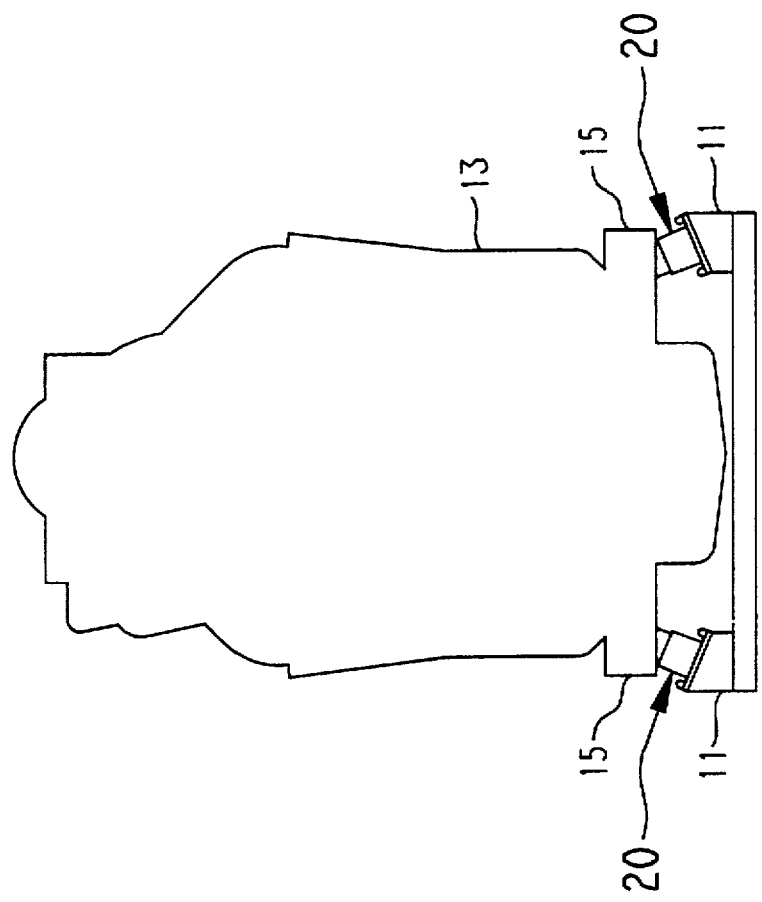
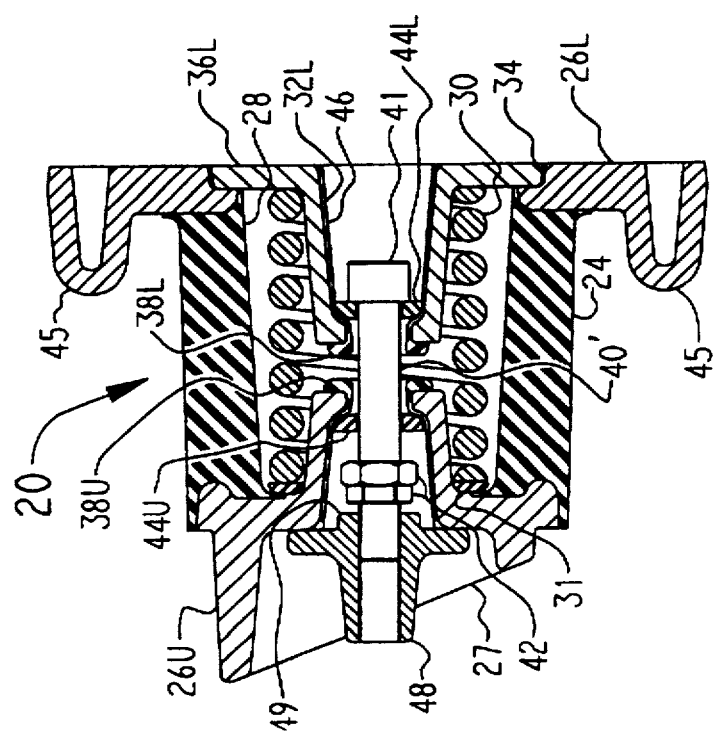

5,782,461

1

SNUBBER USING BULK LOADING

BACKGROUND AND SUMMARY OF THE INVENTION

The present invention is directed to a snubber or bumper for limiting motion of large objects. More particularly, the present invention is directed to a snubber that uses bulk loading of the elastomer to efficiently resist movement of large objects such as diesel engines and the like.

The present application is related to U.S. application Ser. No. 08/618,148 filed Mar. 19, 1996 entitled "Hybrid Elastomer-and-Metal Spring Isolator", which issued Sep. 16, 1997 as U.S. Pat. No. 5,667,202 which is hereby incorporated by reference. In that patent, a group of 10 isolators or so, specifically designed to have low natural frequencies, are used to support a diesel engine and drive train which weighs up to 30 tons. The hybrid isolator of that patent limits vertical movement to ±0.5 inch and snubs the movement in both directions with all metal-to-metal contact being avoided by the provision of an intermediate layer of rubber or other elastomer.

In addition to requiring the vertical movement to be limited to ±0.5 inch, the application requires axial and lateral movement to be limited to a like distance. As mentioned in the above mentioned patent, such movement needs to be restrained because of rigid connections to the engine by auxiliary equipment such as, for example, air inlet ducts, exhaust ducts, fuel lines, auxiliary electrical power connections, and compressed air lines. Such connections permit a modest amount of movement but excursions over several inches are out of the question.

Conventional hydraulic snubbers are not suitable for this application due to spatial constraints and their inability to restrict movement to such small distances. Similarly, elastomeric compression pads relying on the compression of the elastomer alone to snub the movement of the diesel engine cannot generate adequate force to fit within the space envelope available.

The bumper of the present invention provides the desired limited movement through bulk loading the elastomer. An elastomer behaves, when laterally constrained, like an incompressible fluid. The bumper of the present invention includes a central button of solid elastomer which is preferably cylindrical, an elastomeric sleeve surrounding the button, and a gap positioned between the two. The button has a first axial extent that is greater than the axial extent of the sleeve. The sleeve is received in a rigid cup that may be made of any rigid material but is preferably made of carbon steel that confines the bumper and prevents its outward bulging.

By way of example, a bumper will be positioned at each corner of the diesel engine/drive train, on each side and each end, a total of eight in all, spaced from the farthest extent of the engine skid by about ¼". The button itself, by way of example, extends ¼" beyond the surface of the sleeve. When the engine experiences high amplitude, low frequency vibration; it will move back and forth within the ¼" gaps on either side and each end without transmitting any vibratory energy to the support structure. Should the amplitude of the vibratory movement exceed the ¼" space, it will be snubbed by the extended button through the second ¼" of movement. By design, the volume of the gap surrounding the button equals the volume of the portion of the button that extends beyond the sleeve (the button extension). This second ¼ of movement causes the elastomer to "flow" into the gap. When the maximum compression of the button has been achieved,

2

(i.e., when the equivalent of the volume of the button extension has been displaced into the gap), any further movement of the diesel engine and drive train will be resisted by bulk loading of the elastomer in the button and the sleeve and this incompressible fluid will prevent further displacement.

Various other features, advantages, and characteristics of the present invention will become apparent after a reading of the following detailed description of the preferred embodiment(s).

BRIEF DESCRIPTION OF THE DRAWING

The preferred embodiment(s) is described in conjunction with the Drawing, like items bearing like reference numerals and, in which

FIG. 2B is a cross-sectional end view of the isolator shown in FIG. 2A; and

FIG. 3 is a schematic end view of the engine mounting system used with the bumper of the present invention.

DETAILED DESCRIPTION OF THE PREFERRED EMBODIMENT(S)

Figure 1A:
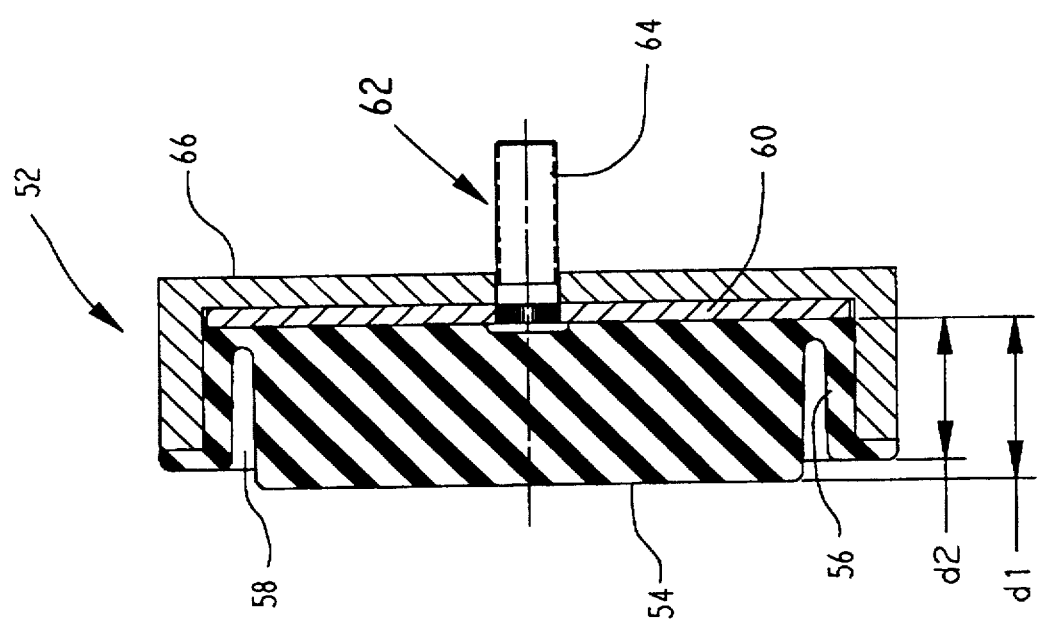
FIG. 1A is a cross-sectional side view of a first embodiment of the bumper or the present invention.
Figure 1C:
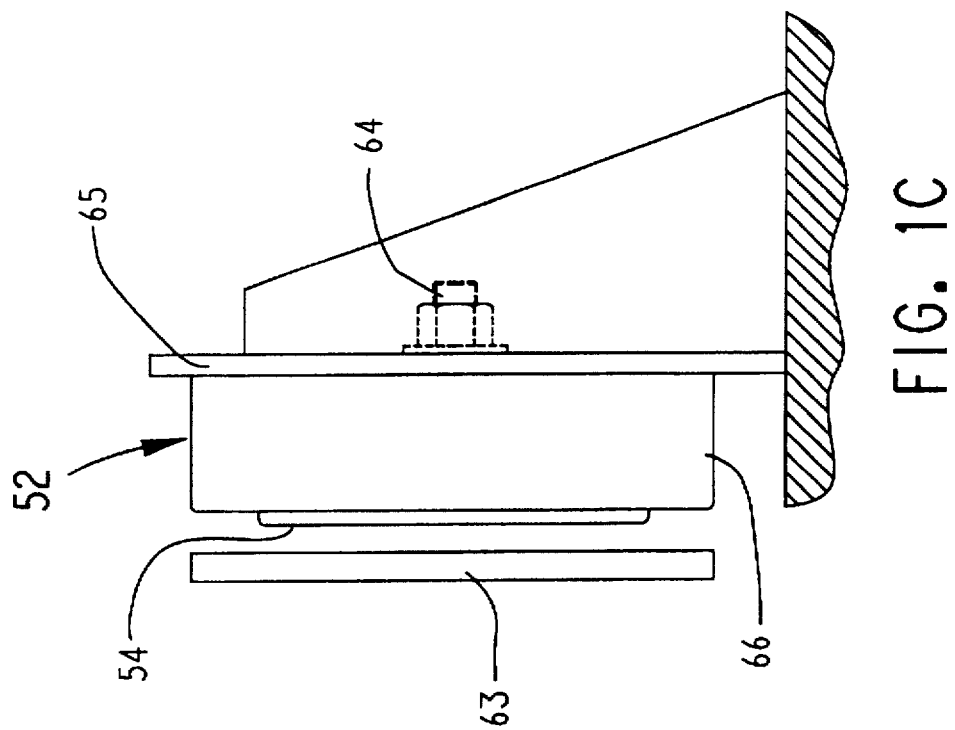
FIG. 1C is a side view of the first embodiment shown in installed position.
Figure 1B:
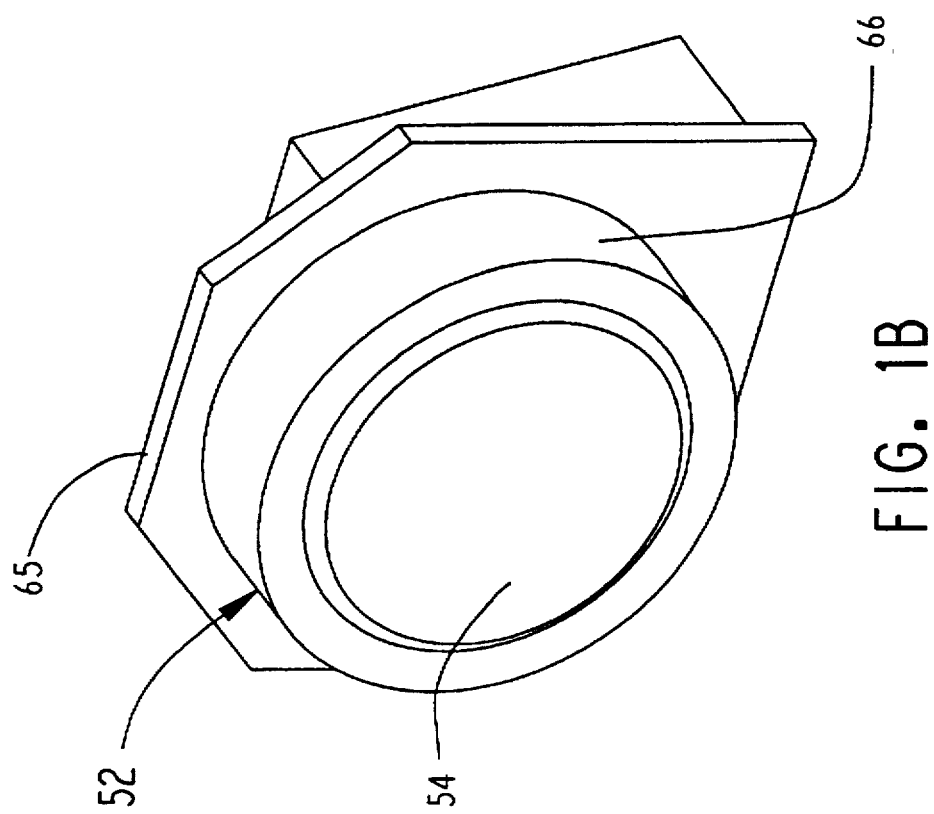
FIG. 1B is a front perspective view of the embodiment of FIG. 1A.

A preferred embodiment of the snubber or bumper of the present invention is shown in FIGS. 1A, 1B and 1C generally at 52. Bumper 52 includes a central button 54 of solid elastomer which has a first axial extent $d_1$. An elastomeric sleeve 56 surrounds button 54 and has a second lesser axial extent $d_2$ and has appreciable thickness amounting to between 35% and 40% of $d_2$. Sleeve 56 is spaced from button 54 by a gap 58 whose volume is designed to equal the volume of the button that extends beyond the sleeve 56, i.e., the volume of gap 58 equals the volume of button 54 which has an axial extent of $d_1-d_2$. The elastomeric members, button 54 and sleeve 56, are bonded to a backing plate 60. One or more attachment bolts 62 extend through plate 60 enabling bumper 52 to be secured in a desired location by securing a nut onto threaded shank 64 after it has been inserted through an opening in a support surface 65 (see FIG. 1C).

Elastomeric sleeve 56 is surrounded by a tight fitting, rigid cup 66 which limits the outward expansion of elastomeric sleeve 56. Rigid cup 66 may be made of steel, aluminum or, in some instances, a rigid plastic. It is preferred that low carbon steel be used to confine elastomeric sleeve 56. In the preferred embodiment, the bumper 52 of the present invention is used in conjunction with a hybrid elastomer-and-metal spring vibration isolator to limit the movement of a large diesel engine to ±0.5" in any of the three axial directions.

Figure 2A:
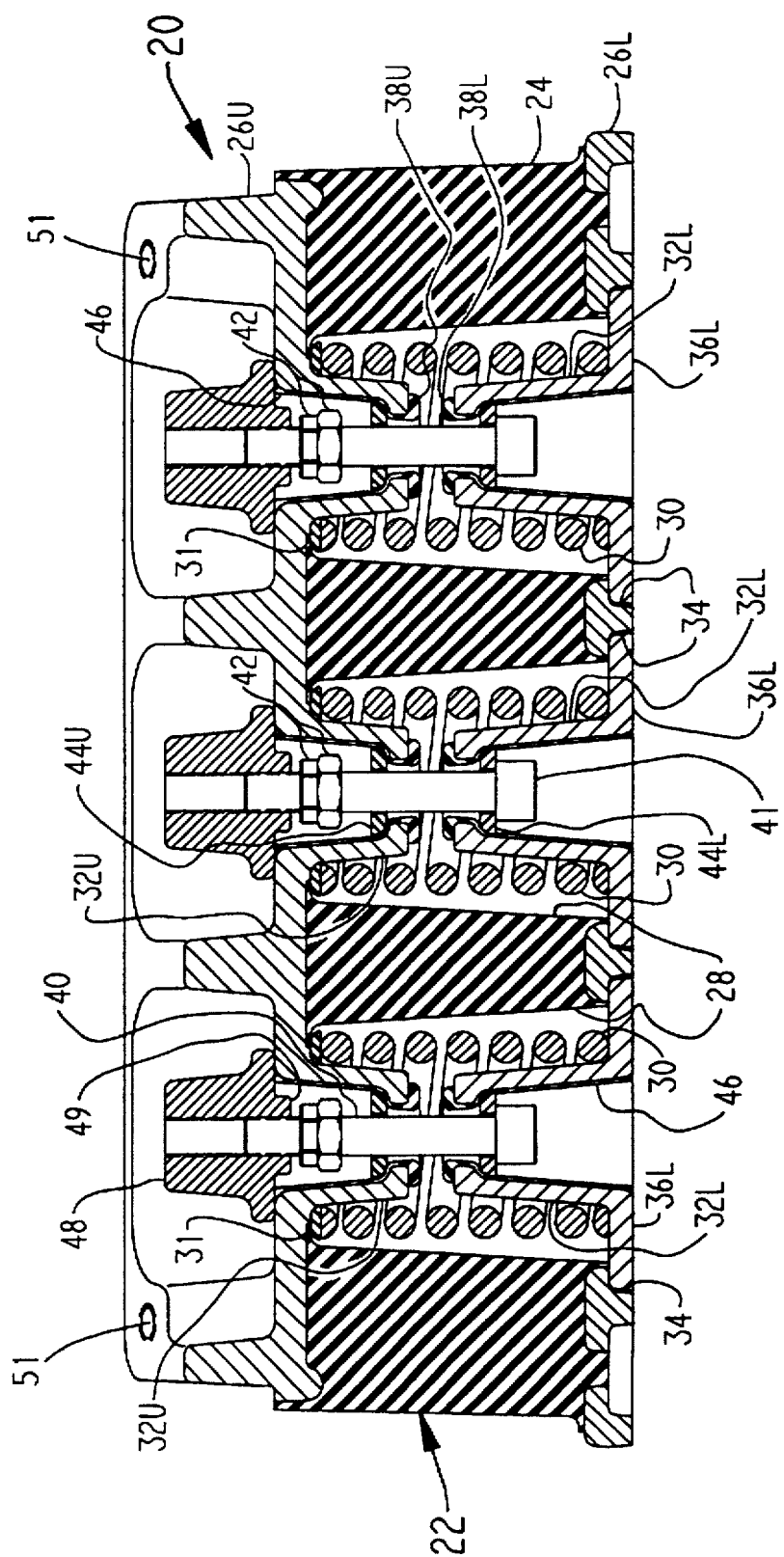
FIG. 2A is a cross-sectional side view of a hybrid elastomer-and-metal spring vibration isolator which may be used in conjunction with the bumper of the present invention, said isolator being described and claimed in the above mentioned copending application.

An embodiment of the hybrid elastomer-and-metal spring vibration isolator which forms the subject matter of copending application Ser. No. 08/618,148 and with which this bumper is used is shown in FIGS. 2A and 2B generally at 20. As best seen in FIG. 2A, isolator 20 comprises a sandwich mount 22 composed of a substantial elastomeric section 24 positioned between first lower metal plate 26L and second upper metal plate 26U. Plates 26L and 26U are preferably bonded to the lower and upper surfaces, respectively, of elastomeric section 24.

Elastomeric section 24 has a plurality of cored out pockets 28 shown in FIG. 2A as being three in number. The actual number of pockets may vary between one and five, depending of the particular needs of the application, three being preferred for this particular usage. The shape of pockets 28 is generally frustoconical, tapering outwardly from top to bottom. It is envisioned that for some applications, pockets 28 may, alternatively, have a cylindrical configuration. The first plurality of pockets 28 receive a second like plurality of helical metal springs 30 which react between the nether surfaces of plates 26L and 26U. A radiused spring seat 31 is provided to prevent the coil spring 30 from initiating a stress crack in elastomeric section 24. The coil springs 30 are designed to fully support the static load of the supported member, in the case of a diesel engine assembly, a thirty ton weight typical of that system. Elastomer in section 24 sees no static load which significantly reduces the flexing strain load thereby extending the useful service life of the elastomer.

In the application where the vibration isolator 20 is used as part of a system to mount a large diesel engine, by lowering the system's natural frequency (SNF) to a range of between 3 and 5 Hz, the SNF is removed from the idle speed range of the diesel engine to a speed range that the engine moves rapidly through during start up. This essentially eliminates the possibility of sustained system resonance and the destructive build up of forces which can be associated therewith.

Lower and upper plates 26L and 26U have a plurality of rigid cavities 32 which are received in pockets 28 inside springs 30. Cavities 32U are shown being cast integrally with plate 26U while cavities 32L are formed separately from plate 26L and their flanges 36L are received within depressions 34 so flanges 36L are flush with the outer surface of plate 26L. Cavities 32 are shown as being frustoconical but, in certain applications, could be cylindrical. The frustoconical shape is preferred for minimizing part contact during relative movement of associated parts. The protruding ends of cavities 32L and 32U have a layer (38L, 38U) of elastomer bonded thereto to provide cushioned snubbing of compressive movement. The first stage of compressive motion will be damped by the hybrid elastomer-and-metal spring 20, with some energy being dissipated as heat but the majority of the energy being returned to the system through the restorative action of the hybrid spring. Should the jostling or vibration of the engine cause downward movement of upper plate 26U toward lower plate 26L in excess of the design maximum, by way of example, ⅛ inch, elastomer layers 38L and 38U will cushion the snubbing action of the opposed protruding ends of cavities 32L and 32U minimizing the shock or concussion impact of the interface, and limiting total vertical deflection to about ½ inch.

A plurality of tension bolts 40 extend through holes in the end of cavities 32 and secure separable lower cavities 32L to the isolator assembly 20. Double securing nuts 42 are threaded on to bolts to a particular design distance from the bolt head 41. This distance establishes a maximum extension distance for the isolator assembly 20 and will be associated with a certain level of preload for the coil springs 30. A pair of steel washers 44L and 44U transfer load from the plates 26U, 26L to bolts 40 for movement in the extension direction while permitting unrestricted vertical and lateral motion when the isolator is not fully extended. The interior of cavities 32L, 32U are coated with an elastomeric layer 46 to provide cushioning for the snubbing performed by washers 44L and 44U as they limit relative movement in the extension direction. Should the supported member cause plate 26U to move beyond the design distance, for example, ½ inch upwardly, each washer 44L and 44U will contact its respective coating 46 thereby cushioning the snubbing of this relative movement. Further, the longitudinal periphery of lower plate 26L is provided with a pair of reinforcing ribs 45 (FIG. 2B) which resist flexing of the lower plate 26L when the isolator 20 is subjected to upward (extension) loads. In addition, coating 46 prevents clatter from metal-to-metal contact between the bolt head 41 or securing nuts 42 with the interior of cavities 32L and 32U, respectively.

Preload retention nuts 48 are attached to the portions of bolts 40 extending beyond securing nuts 42. Each retention nut 48 is formed with a pilot 49 on its plate-engaging surface to facilitate centering in cavity 32U. When engaged, retention nuts 48 fully preload coil springs 30 to a level between 50% and 100% of the static load the isolator 20 will undergo. Once isolators 20 are in position on and secured to deck 11 (FIG. 3) by bolts (not shown) through holes 50 in lower plate 26L so that cavities 32L cannot be displaced, retention nuts 48 are removed. Spring isolator 20 will expand as far as securing nuts 42 allow, due to the force stored in coil springs 30, from the first level of preload (most preferably, an amount equal to the entire static load) to a second lesser level of preload determined by the position of securing nuts 42 on bolts 40. The supported member 13 will then be positioned on the isolator assemblies 20 and secured thereto by bolting into holes 51 in upper plate 26U. The isolators 20 return to their fully loaded positions. As mentioned earlier, this leaves the elastomeric sections 24 without any static load (fully unloaded).

Figure 1D:
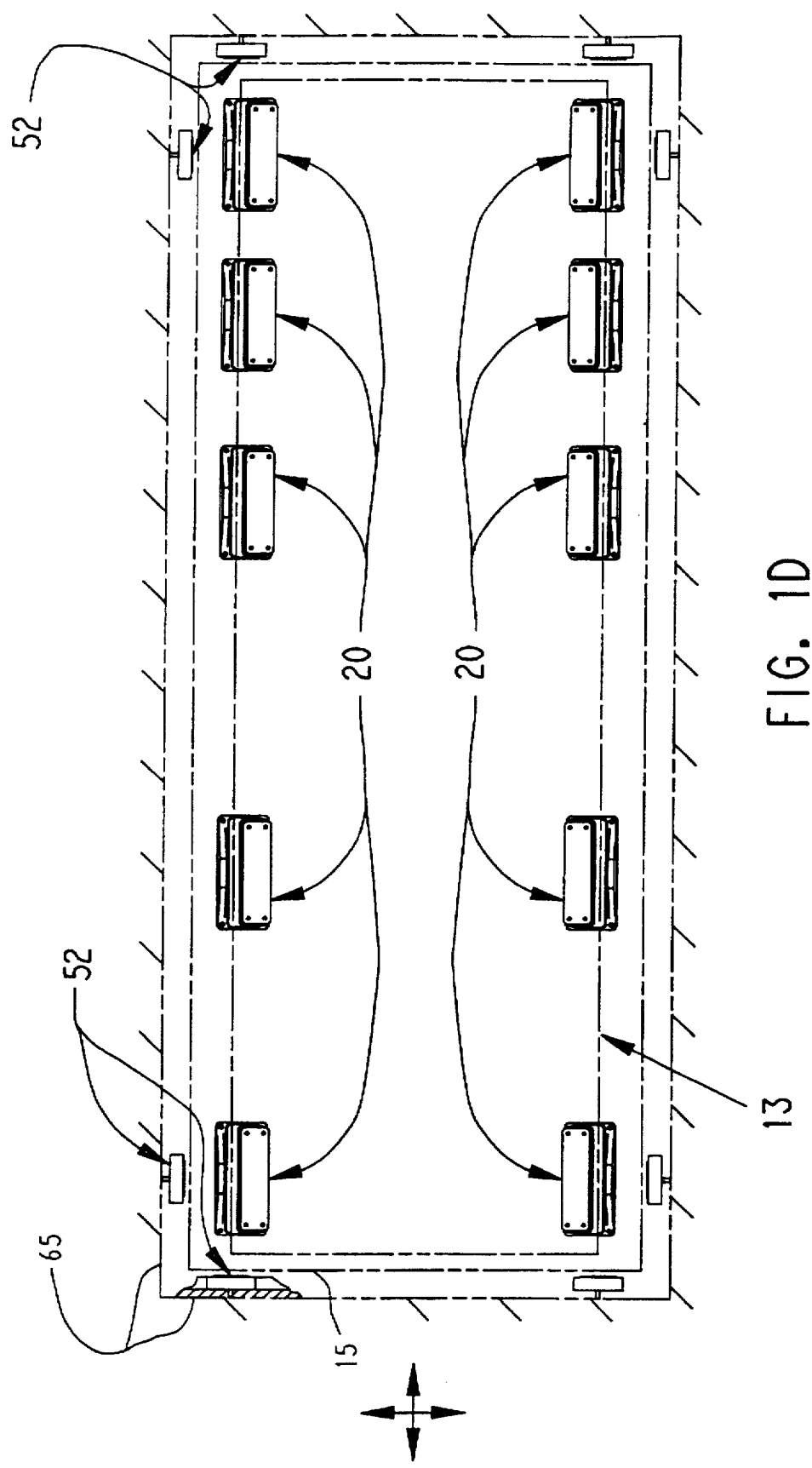
FIG. 1D is a schematic top view of the diesel engine mounting system with which the present invention can be used.

FIGS. 1D and 3 depict a plurality of pairs of isolators 20 used to suspend a 30 ton diesel engine assembly 13. Such large engines are used in locomotive and marine applications. The longitudinal axes, or force reaction lines, of the isolators will normally be inclined from the vertical by an amount of between 20° and 30° (FIG. 3) to semi-focalize the isolator force reaction lines thereby decoupling the translational and rotational modes of response. Full focalization requires the force reaction lines to be tilted relative to the fore-and-aft and lateral axes, as well, to decouple all three rotational modes from their respective translational modes. In this instance, only semi-focalization (that is, focalization about a single axis as discussed more fully in above noted U.S. Pat. No. 5,667,202) is needed and, so the reaction lines are tilted relative to the vertical axis only causing the lateral vibrational motion of the diesel engine 13 to be decoupled from the rolling response about its longitudinal axis. Isolators 20 are positioned on either side of the engine longitudinal centerline in opposing pairs, shown in FIG. 1D as utilizing five pairs of isolators. The number required will vary with the particular engine 13. The upper surface 27 of upper plate 26U has an angle of incline equal to that of the focalization angle such that surface 27 will extend horizontally to engage the lower surface of a mounting skid 15 of engine 13. The tapped holes 51 will be drilled into top plate 26U at a complementary angle so that the attachment bolts (not shown) can be vertically threaded into them securing isolator 20 to skid 15.

In essence, the supported engine 13 floats on the hybrid elastomer-and-metal spring isolator 20 with the elastomer 24 and coil spring 30 free to dynamically react vibrational forces, such that little, if any, vibration is transmitted across the isolator and, should any vibrations be so transmitted as a result of engagement of either the compressive or extension snubbers, such engagement is cushioned. Compression snubbers, in the form of elastomeric cushioning layers 38L and 38U on protruding ends of cavities 32L and 32U respectively, along with extension snubbers in the form of tension bolts 40 cushioned by metal washers 44L and 44U engaging elastomeric layers 46, limit actual total excursion of the engine 13 to ±½ inch, or whatever other level of limited motion is desired. The isolation of assembly 20 is further enhanced by providing a design natural frequency in the range of three to five Hz., a range through which the engine mounted thereupon on briefly transitions during warm up, eliminating the destructive build up of resonant vibrations.

The bumper 52 of the present invention will be described in conjunction with FIGS. 1B, 1C and 1D. By way of example and not limitation, a bumper 52 may be positioned at each of the lateral and axial corners to limit longitudinal and lateral movement (FIG. 1D). The bumper is positioned ¼" from the closest point of the engine assembly. Preferably, a contact pad 63 that is attached to the skid 15 which mounts the diesel engine 13 is juxtaposed next to the button 54 and is of a size larger than the outer dimension of the sleeve 56.

The engine 13 will move ¼" unopposed. Hence, any low amplitude, high frequency vibrations of the engine will not be transmitted to the support structure. Should the engine excursion exceed the free space, the next ¼" of motion will be snubbed by the extending portion of button 54. For any engine movement which exceeds ±0.5", the cup 56 surrounding the elastomer causes it to behave as an incompressible fluid, i.e., the elastomer is loaded in bulk and resists additional movement as the solid support structure would, with the exception that there is no clanking of metal to metal. Bumper 52 is able to provide the desired limited movement with a device which is generally 9" in diameter and less than 3" in depth. Bumper 52 in conjunction with hybrid elastomer-and-metal spring mount 20, restrain diesel engine assembly 13 to ±0.5" of movement along each of the three orthogonal primary axes of movement.

While the bumper 52 has been described as being generally cylindrical in configuration, it will be appreciated that various other shapes including square, oval, rectangular, and triangular could also be used with some decrease in effectiveness since the button 54 will attempt to bulge outwardly into a substantially round configuration. Shapes other than cylindrical will necessarily result in only partial bulk loading or increased stress concentrations as a result of the non-uniform loading. Various other changes, alternatives and modifications will become apparent after a reading of the foregoing specification. It is intended that all such other changes, alternatives and modifications as come within the scope of the appended claims, be considered part of the present invention.

What is claimed is:

1. A bumper for limiting the movement of a large object when mounted adjacent a lateral extent of said large object, said bumper comprising a) a central button of solid elastomer said button having a first axial extent;

b) an elastomeric sleeve interconnected to and surrounding said button and having a second axial extent which is less than said first axial extent;

c) a rigid cup enclosing said elastomeric sleeve and limiting its outward expanse;

d) a backing plate received in said rigid cup to which said central button and elastomeric sleeve are bonded:

e) a gap surrounding said central button and creating a space which extends for substantially all of said second axial extent and defines a first volume; said first axial extent exceeding said second axial extent by an amount which defines a second volume of elastomer, whereby if a large object traverses in a lateral direction into engagement with said bumper with sufficient force, said large object is capable of causing a volume of elastomer equal to said second volume to bulge outwardly to substantially fill said first volume whereby further movement of said large object will be resisted by bulk loading of said elastomer both in said central button and in said elastomeric sleeve due to the confinement thereof by said rigid cup.

2. The bumper of claim 1 wherein said central button is cylindrical.

3. The bumper of claim 2 wherein said gap surrounding said central button is also cylindrical.

4. The bumper of claim 1 wherein said elastomeric sleeve has an appreciable thickness.

5. The bumper of claim 1 wherein said appreciable thickness falls generally in the range of between 35% and 40% of said second axial extent.

6. The bumper of claim 1 wherein said cup member is manufactured from a material from the group consisting of steel, aluminum, iron, and rigid plastic.

7. The bumper of claim 6 further comprising a laterally extending flange extending outwardly from an edge portion of said elastomeric sleeve, said outwardly extending flange being integrally formed with said edge portion and overlying an outer surface of said cup and snubbing contact between said large object and said rigid cup.

8. The bumper of claim 6 wherein said cup is most preferably made of a low carbon steel.

9. A mounting system for a diesel engine which limits movement in each of three axial directions to ±0.5 inch, said mounting system including a set of support, isolators which are focalized relative to at least one axis to decouple a rotational mode of response from a corresponding translational mode of response the improvement comprising a bumper for engaging a lateral surface of a support to which said engine is attached and limiting a distance through which said engine can move in said translational mode said bumper including a) a central button of solid elastomer which has a first axial extent;

b) an elastomeric sleeve interconnected to and surrounding said button, said sleeve having a second lesser axial extent and a thickness in the range of between 35% and 40% of said second axial extent;

c) a gap surrounding said central button and defining a space between said central button and said elastomeric sleeve extending substantially all of said second axial extent, said gap defining a first volume;

d) a rigid cup surrounding said elastomeric sleeve and limiting its outward expansion;

said first axial extent exceeding said second axial extent by an amount which defines a second volume of elastomer, whereby when said diesel engine engages said bumper with sufficient force, it will cause a volume of elastomer equal to said second volume to bulge outwardly to substantially fill said first volume whereby further movement of said diesel engine will be resisted by bulk loading of said elastomer in said central button and in said elastomeric sleeve due to the confinement thereof by said rigid cup.

* * * * *